United States Patent [19]

Seiger

[11] Patent Number: 4,913,781
[45] Date of Patent: Apr. 3, 1990

[54] MICROPOROUS ELEMENTAL SILVER AND METHOD

[75] Inventor: Harvey N. Seiger, Mayfield Heights, Ohio

[73] Assignee: Gould Inc., Rolling Meadows, Ill.

[21] Appl. No.: 98,382

[22] Filed: Sep. 18, 1987

[51] Int. Cl.$^4$ .................... H01M 4/26; H01M 4/34
[52] U.S. Cl. ................................. 204/21; 204/96; 204/109; 429/219
[58] Field of Search .............. 204/2.1, 96, 109–111; 429/219; 423/604

[56] References Cited

U.S. PATENT DOCUMENTS

| | | | |
|---|---|---|---|
| 3,671,321 | 6/1972 | Herman et al. | 136/75 |
| 4,003,757 | 1/1977 | Lux et al. | 429/219 |
| 4,009,056 | 2/1977 | Megahed et al. | 429/126 |
| 4,038,467 | 7/1977 | Lippold et al. | 429/219 |
| 4,120,757 | 10/1978 | Seiger et al. | 204/2.1 |
| 4,269,907 | 5/1981 | Momyer et al. | 429/67 |
| 4,481,266 | 11/1984 | Littaner et al. | 429/12 |
| 4,681,663 | 7/1987 | Seiger | 204/2.1 |

OTHER PUBLICATIONS

Seiger, et al., "Nickel Oxide Electrode Development," in *Proceedings-27th Power Sources Symposium*, Jun. 21–24, 1976, at 115–120.

*Primary Examiner*—John F. Niebling
*Assistant Examiner*—William T. Leader
*Attorney, Agent, or Firm*—Marshall, O'Toole, Gerstein, Murray & Bicknell

[57] ABSTRACT

A method of preparing microporous elemental silver is disclosed wherein a reducible silver compound is electrochemically reduced to form elemental silver. This method serves to introduce microporosity to the silver crystals. Microporous elemental silver can be used for the preparation of bodies of AgO, such as electrodes useful in electrochemical cells.

17 Claims, 5 Drawing Sheets

MICROPOROUS ELEMENTAL SILVER AND METHOD

BACKGROUND OF THE INVENTION

1. Field of the Invention

This invention relates generally to novel forms of elemental silver and, more particularly, this invention relates to microporous elemental silver, methods of preparing the same and methods of preparing articles therefrom.

2. Description of Related Art

Electrochemical cells utilizing bipolar electrode designs having reactive metal electrodes supported on a substrate current collector are well-known. See, for example, Momyer et al, U.S. Pat. No. 4,269,907 (May 26, 1981), the disclosure of which is hereby incorporated by reference, wherein cells including an aqueous electrolyte, an anode of an alkali metal, such as lithium, for example, a cathode spaced from the anode, and an intercell electrical connector are disclosed. The intercell electrical connector typically comprises a substrate of a conductive metal (which may be in the form of foil or a plate) such as nickel or silver-plated nickel. The anode is formed on one surface of the substrate with the cathode of an adjacent cell on the opposite surface of the substrate. In such cells, the cathode may comprise an electrochemically active material, such as silver oxide, and the electrolyte may comprise an aqueous alkaline solution.

Momyer et al. also disclose an electrochemical cell stack comprising a plurality of bipolar electrodes connected in series.

Silver oxide electrodes are generally useful in silver oxide/lithium electrochemical cells as well as in other electrochemical power generating systems, such as silver oxide/aluminum, silver oxide/zinc, silver oxide/iron and silver oxide/cadmium cells. In the past, the silver oxide electrodes used by the silver battery industry have generally been fabricated either from chemically produced silver oxide powder or from metallurgically produced silver powder which in turn is oxidized to form silver oxide.

For example, in forming a silver oxide/lithium bipolar electrode according to the conventional process known as parallel oxidation, silver powder is first extruded onto a transfer paper from a rolling mill. This "biscuit" of silver is then sintered and hot forged onto a conductive metal foil substrate. The metal foil is generally made thin both for design considerations, e.g., weight and volume minimization, and economic considerations, i.e., cost minimization. For example, silver clad nickel foil substrates with a thickness of only about 1 mil are commonly used in the formation of silver oxide/lithium bipolar electrodes. The hot forgings of silver on metal substrates are then assembled in a stack in which the forgings of silver and nickel counter electrodes are alternated and separated by a non-conductive separator material to reduce the likelihood of short circuits developing between the substrates and the forgings of silver during the charging process.

All of the silver forgings in the charging stack are electrically connected in parallel for attachment to the positive terminal of a DC power supply. All of the nickel counter electrodes are in turn electrically connected in parallel for attachment to the negative terminal of the aforementioned DC power supply. The charging stack is then placed in an aqueous electrolyte, such as a metal hydroxide solution. Ionic current flow is generated through the aqueous electrolyte and the silver is thereby oxidized. The electrochemical process occurring at the nickel counter electrodes is cathodization which results in the release of hydrogen gas, as follows:

$$4 H_2O + 4e^- \rightarrow 2H_2 + 4OH^- \tag{1}$$

The silver is electrochemically oxidized first to the monovalent state (see equation 2, below) and may then be oxidized to the divalent level or the peroxide state (see equation 3, below):

$$2 Ag + 2 OH^- \rightarrow Ag_2O + H_2O + 2e^- \tag{2}$$

$$Ag_2O + 2 OH^- \rightarrow 2AgO + H_2O + 2e^- \tag{3}$$

The theoretical electromotive force (EMF) for the oxidation of Ag to the monovalent state is $+0.342$ volt. The standard redox potential of oxygen is $+0.401$ volt and, consequently, oxygen gas does not evolve at the voltage level associated with the oxidation of Ag to the monovalent state. The second stage of oxidation of the active silver material, however, occurs at an electric potential of about $+0.599$ volt which is nearly 0.2 volt greater than the oxygen evolution voltage. Consequently, the oxidation process at this upper voltage level is inefficient as oxygen gas is evolved thereby.

Many applications require batteries having both a high capacity and a high rate of discharge. Further, because of design considerations, many applications require batteries having essentially flat electrodes. Flatness is a particularly important consideration in bipolar electrode configurations wherein both the anode and the cathode active materials are bonded on opposite sides of a conductive metal substrate.

The above-described parallel oxidation method of electrode formation, however, frequently results in bent electrodes. For example, the silver oxide electrodes made by the above-described method of oxidation are frequently of a bent, irregular shape. The bending of the electrodes is believed to be largely a result of the stoichiometric and molar volume changes which occur upon oxidation during electrode formation and is commonly referred to as "potato chipping".

SUMMARY OF THE INVENTION

It is an object of the invention to overcome one or more of the problems described above.

According to the invention, a method of preparing microporous elemental silver comprises the step of electrochemically reducing a reducible silver compound to form elemental silver.

In addition, the invention comprehends compositions of matter prepared by the above process.

Also, the invention comprehends the use of the microporous elemental silver in the preparation of silver oxide bodies.

Other objects and advantages will be apparent to those skilled in the art from the following detailed description taken in conjunction with the figures and the appended claims.

DETAILED DESCRIPTION OF THE INVENTION

According to the invention, the preparation of elemental silver by the electrochemical reduction of a reducible silver compound introduces microporosity to the silver crystals. This microporosity assists in stabilizing the dimensions of the silver active material so that an article comprising such microporous silver material will have geometric measurements such as length, width, and thickness which remain virtually constant regardless of the oxidation state thereof.

Figure 1:
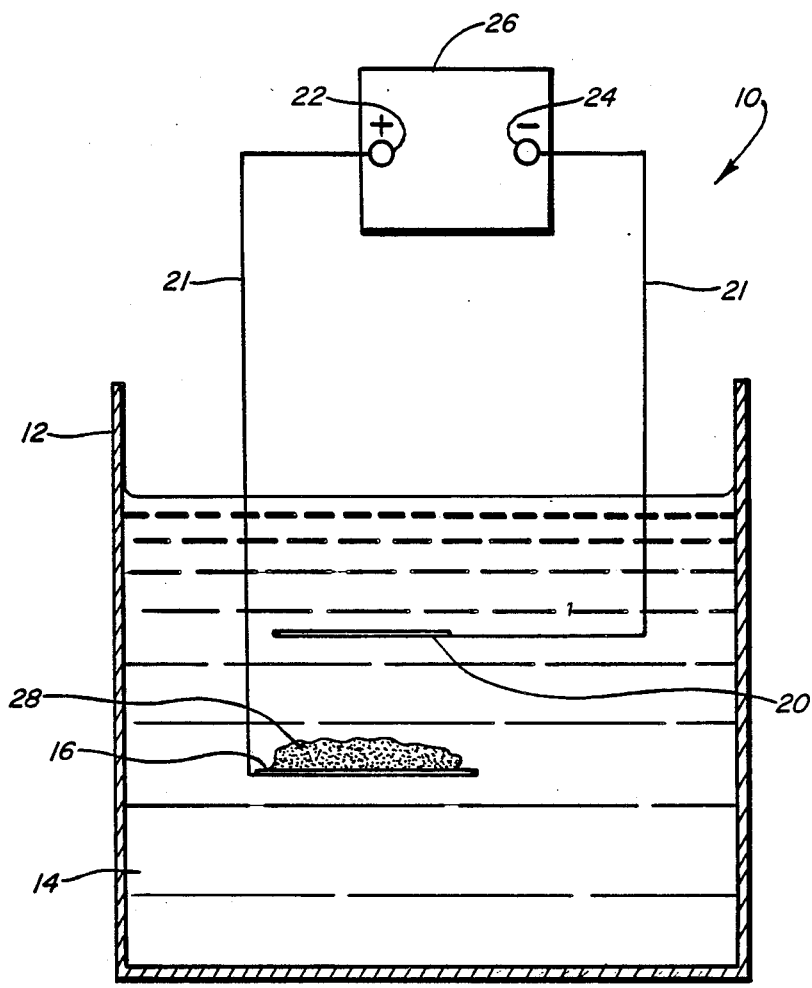
FIG. 1 is a simplified schematic representation of a system for the electrochemical preparation of microporous elemental silver according to a typical embodiment of the invention.

Referring to FIG. 1, a system, generally designated 10, for the electrochemical preparation of microporous elemental silver is shown. The system 10 includes a container 12 holding a quantity of aqueous electrolyte 14. A pair of horizontal conductive metallic sheets, 16 and 20, respectively, are disposed in the aqueous electrolyte 14 and are electrically connected by wiring 21 to the positive and negative terminals 22 and 24, respectively, of a power supply 26. The sheets 16 and 20 comprise, for example, substantially non-porous metallic elemental silver foil. The aqueous electrolyte 14 may be, for example, an alkaline earth or alkali metal hydroxide such as an aqueous solution of KOH with a concentration in the range of 10-45 wt% (thereby providing conductivity) and preferably 30-40 wt% (thereby facilitating the handling and reducing the temperature sensitivity of the solution). Such aqueous electrolytes can generally be used at any temperature above freezing and below boiling, preferably at 20-35° C.

A quantity of precursor material 28, such as metallic elemental silver powder, for example, is disposed on the silver sheet 16. Reference herein to the use of elemental silver powder as the precursor material 28 is exemplary only, and the invention is understood to encompass the use of other forms of silver precursor material. For example, a precursor material comprising silver nitrate when placed in an alkaline medium converts to $Ag_2O$ and thereby eliminates the need to separately oxidize the precursor material.

The aqueous electrolyte 14 covers the silver powder 28 and electric current produced by the power supply 26 is passed through the wiring 21 and subsequently through the silver sheets 16 and 20 and the electrolyte 14. The silver powder 28 on the sheet 16 (which is connected to the positive terminal 22 of the power supply 26) is anodized (i.e., oxidized) while the sheet 20 is cathodized (i.e., reduced) with hydrogen gas being released therefrom, such as by equation (1), above.

As a result, the silver powder 28 is oxidized to the monovalent state, i.e., to $Ag_2O$, according to reaction (2), above.

It is to be understood that in the electrochemical preparation of microporous elemental silver, the elemental silver may initially be anodized to the monovalent state or beyond but that oxidation to the divalent state is not necessary and in view of increased energy required to effect such oxidation, may in fact be disfavored.

The electrical connections are then reversed whereby the oxidized silver 28 is reduced (discharged) to form microporous elemental silver. The resulting microporous elemental silver may be used to form a body of silver oxide (AgO), such as AgO electrodes for use in electrochemical cells, for example.

Figure 2:
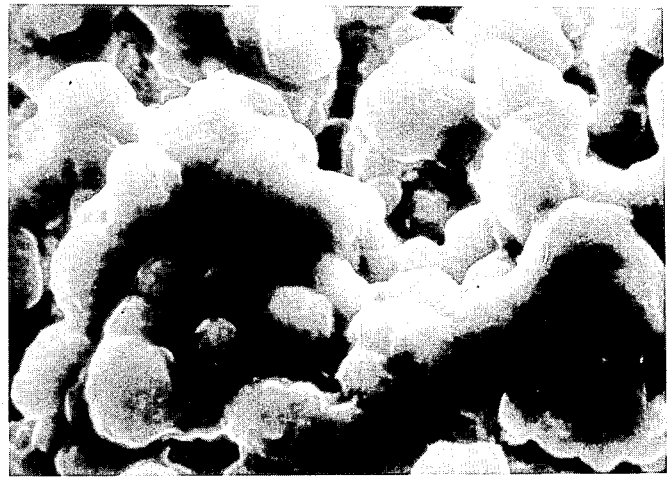
FIG. 2 is a photomicrograph (3000 magnification) of non-microporous elemental silver prepared using a prior art method.
Figure 3:
FIG. 3 is a photomicrograph (2900 magnification) of AgO crystals prepared by charging (anodizing) non-porous elemental silver.

Silver material, in various forms, has been observed microscopically using a scanning electron microscope (SEM). FIG. 2 is a magnified view of nonmicroporous elemental silver prepared using a prior art method. FIG. 3 is a magnified view of AgO crystals prepared by oxidizing non-porous elemental silver showing the enlargement of the silver grain to crystals generally having ten (10) sides. The subsequent reduction of AgO according to the present invention introduces a microporosity within the elemental silver crystals as shown in FIG. 4.

Figure 4:
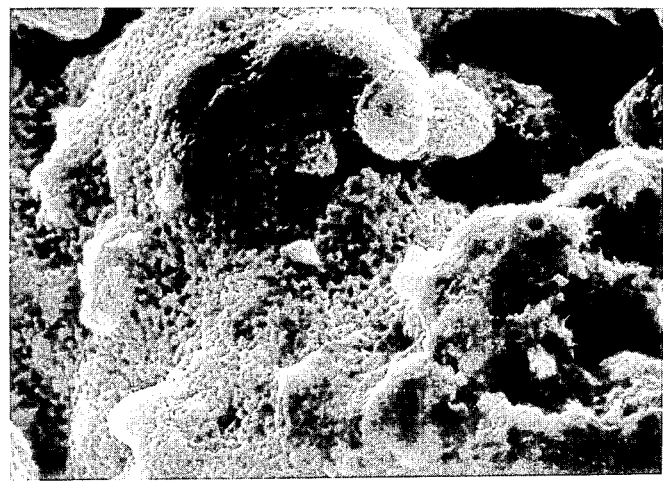
FIG. 4 is a photomicrograph (3000 magnification) of electrochemically prepared microporous elemental silver according to a typical embodiment of the invention.

The electrochemically prepared elemental silver shown in FIG. 4 has conformal grains which are larger than those of the prior art prepared elemental silver of FIG. 2. In addition to macropores, as are present in the prior art prepared elemental silver, electrochemically prepared silver contains micropores, as shown in FIG. 4. Subsequent oxidation of precursor electrodes made of such electrochemically prepared silver, as described below, will usually not create stress conditions in the precursor electrode as are commonly associated with precursor electrodes prepared from non-microporous silver and which result in bent, irregularly shaped silver oxide electrodes.

Generally, according to the invention, a body of AgO may be prepared by electrochemically reducing a reducible form of silver to form microporous elemental silver. The microporous elemental silver is then formed into an integral body with the microporous silver subsequently being oxidized to form AgO.

Figure 5:
FIG. 5 is a simplified flow diagram for the formation of a silver oxide/reactive metal bipolar electrode.

Referring to FIG. 5, a simplified flow diagram of a process for the formation of a silver oxide/reactive metal bipolar electrode is shown. It is to be understood, however, that bipolar electrodes are only an example of the form that the bodies of AgO, as prepared according to the invention, may take.

Microporous elemental silver, such as that prepared using the system of FIG. 1, is washed with water or other suitable liquid to remove remaining traces of the aqueous hydroxide electrolyte. (Such hydroxides can react with carbon dioxide, as is present in air, to form basic carbonates which can clog at least some of the pores of the microporous elemental silver.)

Thereafter, using a process analogous to the above-described process of parallel oxidation a bipolar electrode is made wherein the microporous elemental silver is utilized as a precursor electrode material. In such a process, the microporous elemental silver is placed on a transfer paper from a rolling mill. This "biscuit" of microporous elemental silver is then sintered and hot forged onto a conductive metal foil substrate, such as a silver clad nickel foil as is known to those in the art. These hot forgings of microporous elemental silver on metal substrates are then assembled in a stack in which the forgings of microporous silver and nickel counter electrodes are alternated. The silver forgings and the nickel counter electrodes are separated by a non-conductive separator material to reduce the likelihood of the development of short circuits during oxidation of the elemental silver. The elemental silver forgings are then oxidized, such as through techniques known in the art, to form silver oxide.

In such a process, a precursor electrode of microporous elemental silver is oxidized to sequentially form $Ag_2O$ and $AgO$. Upon oxidation, the microporous elemental silver forms $AgO$ crystals, with enlargement of the silver grain to crystals occurring largely in the void volume as provided by the micropores of the silver material and only in relatively minor proportion in the macropores of the precursor material. Thus, electrochemically prepared silver will not experience significant changes in particle size upon subsequent oxidation to the silver oxide form and a precursor electrode prepared from electrochemically prepared elemental silver will have virtually constant dimensions, regardless of the oxidation state thereof.

The silver clad nickel foil with the silver oxide adhered thereto is washed and dried to remove water and remaining traces of hydroxide from the electrolyte because such materials may undesirably react with the reactive anodic material. The reactive anodic material is subsequently adhered to the face of the silver clad nickel foil substrate, such as through the simple application of pressure, to complete the formation of the silver oxide/reactive metal bipolar electrode. Typically, the reactive anode comprises an alkali metal such as sodium, for example, and preferably lithium. Reference herein to the preferred lithium is exemplary only, and the invention is understood to encompass the use of other reactive metals.

Figure 6:
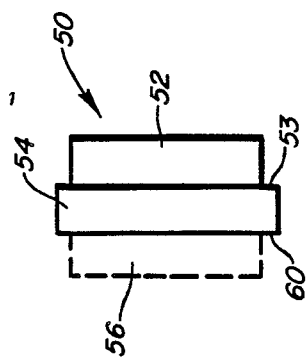
FIG. 6 is a simplified cross-sectional schematic view, partially in phantom, of a silver oxide/reactive metal bipolar electrode, prepared according to the invention.

In FIG. 6, the bipolar electrode 50 is shown with a silver oxide electrode 52 adhered to the face 53 of a silver clad nickel foil substrate 54.

The lithium anode material 56 (shown in phantom) is adhered to the face 60 of the silver clad nickel foil to complete the formation of the bipolar electrode 50.

According to the invention, the electrochemical reduction of an oxidized form of silver results in the formation of a microporous form of elemental silver. Chemical reduction of oxidized forms of silver, however, does not necessarily result in the production of microporous forms of silver. For example, chemical reduction of silver compounds, as is common in the photographic film industry, produces non-porous forms of silver.

In processing non-porous and microporous silver active material, it has been found that after washing with water and upon drying, e.g., heating at 80° C. for about 2 hours, that the non-porous silver will be dried out while the microporous silver of the invention will still be heavy with water trapped in the micropores of the silver material.

It is believed that microporous elemental silver can be prepared from reducible forms of silver other than the material which results from the initial oxidation of elemental silver, i.e., other than $AgO$, $Ag_2O$ and mixtures thereof. For example, it is believed that microporous elemental silver can be formed by reducing $AgO$, $Ag_2O$, $Ag_2C_2O_4$ (silver oxalate), $Ag_2CO_3$ (silver carbonate) or mixtures thereof.

EXAMPLE

The following specific example is provided to clearly illustrate one embodiment of the invention, but should not be construed to limit the scope of the invention.

In a cylindrical glass beaker analogous to the apparatus of FIG. 1, two silver trays 16 and 20 were disposed horizontally about 2 cm apart from each other. Each tray was loaded with elemental silver powder of the type conventionally prepared for processing into silver oxide electrodes. The trays were loaded to a silver thickness of about 5 mm, or 2 grams per $cm^2$. Each tray was connected via a tab and associated wiring 21 to the respective terminals of a DC power supply 26.

The beaker was filled with 7 M aqueous KOH to cover the silver powder and trays. Current was applied at a current density of 100 mA per $cm^2$ for 10 hours. The tray and powder connected to the positive terminal was anodized to $AgO$ while $H_2$ gas escaped from the other tray and powder.

The leads were then reversed and current applied. The $AgO$ was reduced to microporous elemental silver. At the same time, the other powder and tray were anodized. After this start-up procedure, microporous silver may be obtained from the tray which had been reduced, and it can be restocked with a fresh supply of elemental silver powder.

The voltage required for this operation was initially about 2 volts and subsequently less than 1 volt. These values are not critical and are of importance only for selection of the power supply.

The foregoing detailed description is given for clearness of understanding only, and no unnecessary limitations are to be understood therefrom, as modifications within the scope of the invention will be obvious to those skilled in the art.

I claim:

1. A method of preparing microporous elemental silver, said method comprising the steps of
   (a) oxidizing elemental silver powder particles to at least the monovalent state;
   (b) electrochemically reducing oxidized silver powder particles from step (a) to form microporous particles of elemental silver wherein said steps (a) and (b) are carried out in a system which comprises a pair of spaced conductive metallic sheets of nonporous metallic elemental silver foil disposed in an aqueous electrolyte, at least one of said sheets supporting supply of elemental silver powder particles to be oxidized or reduced, said sheets being in electrical contact with a power supply to effect ionic current flow in said electrolyte between said sheets.

2. The method of claim 1 wherein substantially all of said precursor elemental silver is oxidized only to the monovalent state prior to said reducing step.

3. The method of claim 1 wherein said electrolyte comprises an aqueous solution of an alkaline earth metal hydroxide or an alkali metal hydroxide.

4. The method of claim 3 wherein said electrolyte comprises an aqueous solution of KOH in a concentration in the range of about 10 to 45 wt %.

5. A composition of matter prepared by the process of claim 1.

6. The composition of claim 5 wherein said electrolyte comprises an aqueous solution of an alkaline earth metal hydroxide or an alkali metal hydroxide.

7. The composition of claim 6 wherein said electrolyte comprises an aqueous solution of KOH in a concentration in the range of about 10 to 45 wt %.

8. The composition of claim 5 wherein said spaced metallic sheets comprise non-porous metallic elemental silver foil.

9. A method of preparing a body of AgO, said method comprising the steps of:
   (a) electrochemically reducing particles of a reducible silver compound to form microporous elemental silver;
   (b) forming an integral, macroporous body from particles of said microporous elemental silver; and,
   (c) oxidizing said microporous elemental silver of said integral macroporous body to form AgO.

10. The method of claim 9 wherein said reducible silver compound is selected from the group consisting of AgO, $Ag_2O$, $Ag_2C_2O_4$, $Ag_2CO_3$ and mixtures thereof.

11. The method of claim 9 wherein said reducible silver compound is selected from the group consisting of AgO, $Ag_2O$ and mixtures thereof.

12. The method of claim 9 wherein said reducible silver compound is prepared by oxidizing precursor elemental silver to at least the monovalent state prior to said reducing step (a).

13. The method of claim 12 wherein substantially all of said reducible silver compound comprises precursor elemental silver oxidized only to the monovalent state prior to said reducing step (a).

14. The method of claim 12 wherein said precursor elemental silver comprises a powder.

15. The method of claim 12 wherein substantially all of said microporous elemental silver is oxidized to form AgO.

16. The method of claim 9 wherein said body of AgO comprises an electrode of AgO.

17. An electrode of AgO prepared by the process of claim 16.

* * * * *

UNITED STATES PATENT AND TRADEMARK OFFICE
CERTIFICATE OF CORRECTION

PATENT NO.   :   4,913,781
DATED        :   April 3, 1990
INVENTOR(S)  :   Harvey N. Seiger It is certified that error appears in the above-identified patent and that said Letters Patent is hereby corrected as shown below:

```
     On the face of the patent, under the heading "Assignee:"

"Gould Inc., Rolling Meadows, Ill." should be

--Westinghouse Electric Corp., Pittsburgh, Pa.--.
```

Signed and Sealed this

Seventh Day of January, 1992

Attest:

HARRY F. MANBECK, JR.

*Attesting Officer*     *Commissioner of Patents and Trademarks*